United States Patent
Mihara

(10) Patent No.: US 6,934,095 B2
(45) Date of Patent: Aug. 23, 2005

(54) ELECTRONIC IMAGING APPARATUS

(75) Inventor: Shinichi Mihara, Tama (JP)

(73) Assignee: Olympus Corporation, Tokyo (JP)

(*) Notice: Subject to any disclaimer, the term of this patent is extended or adjusted under 35 U.S.C. 154(b) by 0 days.

(21) Appl. No.: 10/746,655

(22) Filed: Dec. 29, 2003

(65) Prior Publication Data

US 2004/0135917 A1  Jul. 15, 2004

(30) Foreign Application Priority Data

Jan. 15, 2003  (JP) ........................................ 2003-007346

(51) Int. Cl.[7] ........................... G02B 17/00; G02B 15/14
(52) U.S. Cl. ....................... 359/726; 359/727; 359/729; 359/676
(58) Field of Search ................................. 359/726, 727, 359/729, 730, 732, 676, 738, 739, 740

(56) References Cited

U.S. PATENT DOCUMENTS

2002/0000511 A1 * 1/2002 Schaffer et al. ............. 250/216

FOREIGN PATENT DOCUMENTS

JP          05-27093       4/1993
JP          11-160739      6/1999

* cited by examiner

Primary Examiner—Timothy Thompson
(74) Attorney, Agent, or Firm—Kenyon & Kenyon

(57) ABSTRACT

An electronic imaging apparatus includes an optical system that has a reflecting surface for bending an optical path, and a variable-transmittance optical element placed in the optical system. The variable-transmittance optical element is constructed so that a ray of light passes through the optical element a plurality of times. Whereby, a slim-design electronic imaging apparatus can be provided which is small in size and extremely small in depth and in which the amount of light can be adjusted in a wide range.

12 Claims, 6 Drawing Sheets

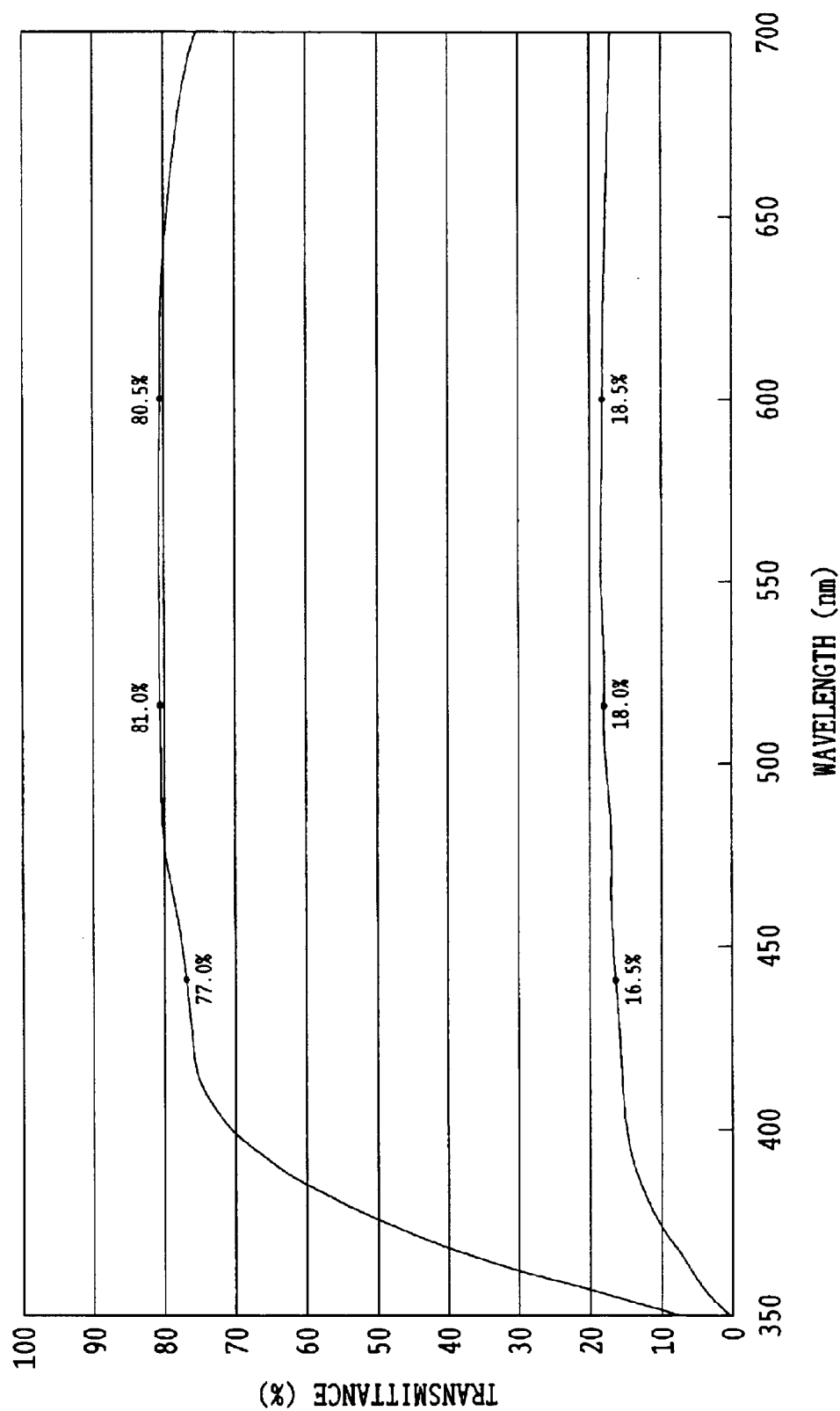

ELECTRONIC IMAGING APPARATUS

BACKGROUND OF THE INVENTION

1. Field of the Invention

This invention relates to an electronic imaging apparatus in which the amount of light is adjusted by a system that the internal transmittance of an optical system is changed.

2. Description of Related Art

Recent electronic imaging apparatuses including digital cameras are progressing in compact or slim design. The compact or slim design largely depends on compactness of an electric circuit or of a recording medium. Consequently, the proportion of an optical system to the entire imaging apparatus is relatively increased. Thus, the optical system, notably a zoom lens, is also progressing in compact design through compactness of an image sensor. For example, a collapsible mount type lens barrel is adopted. The collapsible mount type lens barrel is constructed so that the optical system is shifted outward in photography and is incorporated in the body of the electronic imaging apparatus in carrying.

With the progress of the compact design, however, a limit occurs to downsizing of the entire optical system according to compactness of the image sensor. This is because the physical work of lens elements constituting the optical system, the mechanical strength of a system mechanism, and fabrication accuracy are restricted. Consequently, provisions have been made for using aspherical surfaces and high-refractive-index and low-dispersion glass materials to decrease the number of components to a minimum. However, this is also restricted because of the maintenance of the basic specification and correction for aberration. Thus, a reduction in volume or overall length of the optical system or a slim design relating to a depth where the lens barrel is collapsed reaches a limit.

Thus, as approaches of achieving the slim design relating to the depth in particular, the following techniques are available. One of them is to provide a reflecting surface for bending the optical path in an optical system. Another is to use electrochromic elements instead of optical filters and dichroic mirrors. In the latter case, a plurality of electrochromic elements in different wavelength regions of transmission light are combined (refer to, for example, Japanese Patent Kokai No. Hei 11-160739). Such techniques contribute largely to the slim design of the body of the electronic imaging apparatus.

However, in each of these techniques, the problem of diffraction has ceased to be negligible with compactness of the electronic image sensor. For example, when the stop is stopped down above F/5.6, the deterioration of image quality becomes remarkable, thus causing a new problem that the range of adjustment of the amount of light is narrowed. Consequently, techniques of replacing some optical elements in order to lower the transmittance and of using a variable-transmittance optical element have been proposed.

SUMMARY OF THE INVENTION

The electronic imaging apparatus according to the present invention uses an optical system that has at least one reflecting surface for bending the optical path, and is constructed so that the optical system is provided with an optical element (for example, the electrochromic element) that the transmittance of light can be changed, and the optical path passes through the optical element a plurality of times.

The electronic imaging apparatus according to the present invention uses an optical system that has at least one reflecting surface for bending the optical path, and is constructed so that an optical element (for example, the electrochromic element) that the transmittance of light can be changed is provided on or immediately before the reflecting surface, and the optical path passes through the optical element a plurality of times.

The electronic imaging apparatus is preferably constructed so that a transmittance $\tau 520$ where light of wavelength 520 nm passes once through the optical element is within the limit of $\tau \min \leq \tau 520 \leq \tau \max$ to satisfy the following conditions:

$$0.70 < \tau 440/\tau 520 < 1.20$$

$$0.80 < \tau 600/\tau 520 < 1.30$$

where $\tau 440$ is the transmittance of light of wavelength 440 nm and $\tau 600$ is the transmittance of light of wavelength 600 nm. Here, $\tau \min$ is the minimum transmittance where the element that the transmittance can be changed is in the most opaque state and $\tau \max$ is the maximum transmittance where the element that the transmittance can be changed is in the most transparent state.

The electronic imaging apparatus according to the present invention uses an optical system that has at least one reflecting surface for bending the optical path, and is constructed so that the reflecting surface is provided with an optical element that the reflectance of light can be changed, a reflectance $R520$ of light of wavelength 520 nm is within the limit of $R\min \leq R520 \leq R\max$, and a spectral reflectance satisfies the following conditions:

$$0.50 < R440/R520 < 1.40$$

$$0.60 < R600/R520 < 1.70$$

where $Rx$ (where x is numeral) is the reflectance of light of wavelength x nm, that is, $R520$ is the reflectance of light of wavelength 520 nm, $R440$ is the reflectance of light of wavelength 440 nm, and $R600$ is the reflectance of light of wavelength 600 nm. Here, $R\min$ is the minimum reflectance where the element that the reflectance can be changed is in the most transparent state and $R\max$ is the maximum reflectance where the element that the reflectance can be changed is in the most opaque state.

According to the present invention, the optical element is preferably constructed of a medium that a chemical change is electrically controlled and thereby the transmittance of light can be changed.

According to the present invention, the optical system preferably includes a lens unit that has the positive refracting power and is simply moved toward the object side when the magnification of the optical system is changed in the range from a wide-angle position to a telephoto position.

According to the present invention, the optical system preferably includes at least one reflecting surface for bending the optical path, located on the object side of the most object-side lens of all lens units that are movable in the magnification change.

According to the present invention, the optical system preferably includes at least one prism so that the reflecting surface is placed practically parallel to one surface of the prism and the medium that the transmittance of light can be changed is interposed between the surface of the prism and the reflecting surface.

According to the present invention, the prism is preferably located at the most object-side position of the optical path passing through the optical system.

According to the present invention, the most object-side surface (the entrance surface) of the prism through which the optical path passes is preferably concave.

According to the present invention, it is desirable that the refractive index of the prism is higher than 1.68, higher than 1.75, or higher than 1.80.

According to the present invention, a movable lens unit located at the most image-side position of the optical system preferably has a focusing function.

According to the present invention, the electronic imaging apparatus preferably has a means for electrically controlling electric signals relating to the condition of the optical system and to an image derived from the electronic image sensor, and the transmittance of the medium.

According to the present invention, a slim-design electronic imaging apparatus can be provided which is small in size and extremely small in depth and in which the amount of light can be adjusted in a sufficiently wide range.

These and other features and advantages of the present invention will become apparent from the following detailed description of the preferred embodiments when taken in conjunction with the accompanying drawings.

BRIEF DESCRIPTION OF THE DRAWINGS

FIG. 6 is a diagram showing spectral characteristics of the electrochromic element sandwiched between two glass plates, each 1 mm thick, used as the variable-transmittance material.

DETAILED DESCRIPTION OF THE PREFERRED EMBODIMENTS

Figure 1:
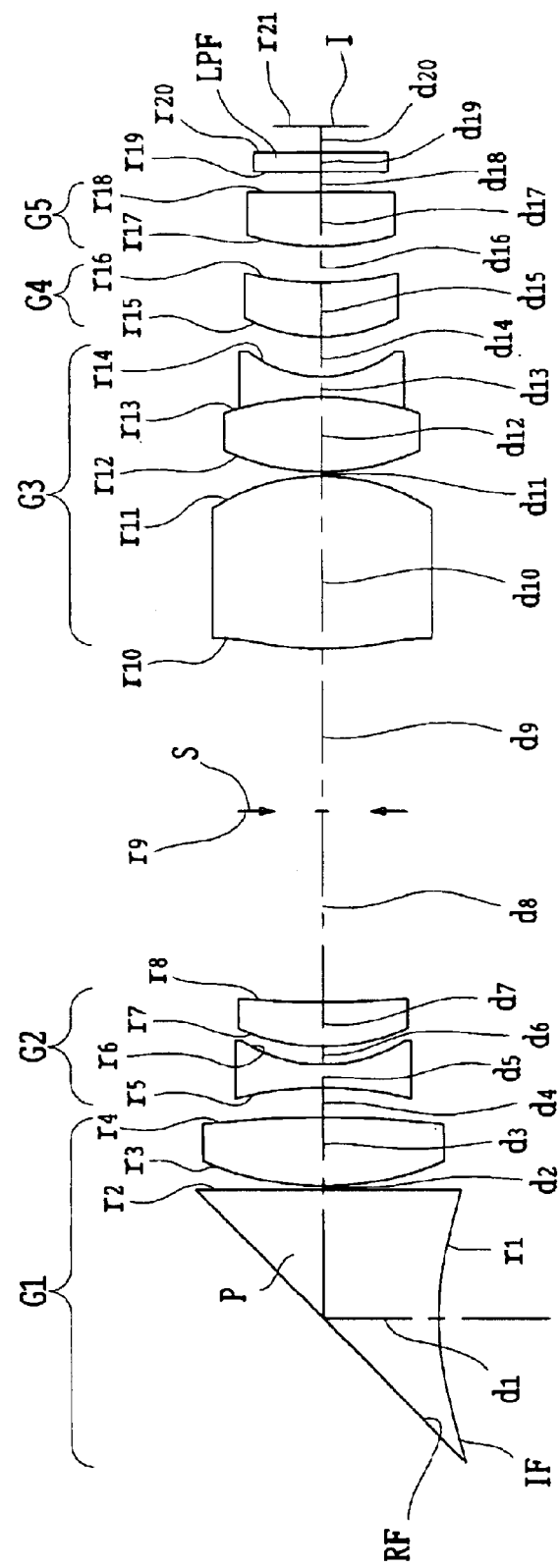
FIG. 1 is a sectional view showing an optical arrangement, developed along the optical axis, where a variable-reflectance material comes in close contact with a reflecting surface in a first embodiment of the electronic imaging apparatus according to the present invention.

In accordance with the embodiments shown in the drawings, the present invention will be described below. Before undertaking the description of the embodiments, the function and effect of the present invention will be explained.

According to the present invention, the reflecting surface provided in the optical system is used so that an imaging beam of light passes, for example, twice, through the optical element with a narrow variable-transmittance range. By doing so, the ratio between the maximum and minimum values of the transmittances of the entire optical system becomes approximately square and the range of adjustment of the amount of light is widely enlarged. In the present invention, in order to make the imaging beam to pass twice through the optical element, the optical element is preferably placed on or immediately before the reflecting surface. This is advantageous for the compact design of the optical system. In addition, it is desirable that a transmittance $\tau 520$ where light of wavelength 520 nm passes once through the optical element is within the limit of $\tau min \leqq \tau 520 \leqq \tau max$ to satisfy the following conditions simultaneously:

$$0.70 < \tau 440/\tau 520 < 1.20 \tag{1}$$

$$0.80 < \tau 600/\tau 520 < 1.30 \tag{2}$$

where $\tau x$ (where x is numeral) is the transmittance of light of wavelength x nm. Here, $\tau min$ is the minimum transmittance where the element that the transmittance can be changed is in the most opaque state and $\tau max$ is the maximum transmittance where the element that the transmittance can be changed is in the most transparent state.

If one of Conditions (1) and (2) is not satisfied, a color balance will be liable to deteriorate, which is unfavorable.

It is more desirable to satisfy the following conditions:

$$0.75 < \tau 440/\tau 520 < 1.15 \tag{1'}$$

$$0.85 < \tau 600/\tau 520 < 1.25 \tag{2'}$$

It is most desirable to satisfy the following conditions:

$$0.80 < \tau 440/\tau 520 < 1.10 \tag{1''}$$

$$0.90 < \tau 600/\tau 520 < 1.20 \tag{2''}$$

In the above disclosure, reference is made to the variable-transmittance optical element, but instead of this, a variable-reflectance optical element may be used. In this case also, it is desirable that a reflectance R520 of light of wavelength 520 nm is within the limit of $Rmin \leqq R520 \leqq Rmax$ to satisfy the following conditions:

$$0.50 < R440/R520 < 1.40 \tag{3}$$

$$0.60 < R600/R520 < 1.70 \tag{4}$$

where Rx (where x is numeral) is the reflectance of light of wavelength x nm, that is, R520 is the reflectance of light of wavelength 520 nm, R440 is the reflectance of light of wavelength 440 nm, and R600 is the reflectance of light of wavelength 600 nm. Here, Rmin is the minimum reflectance where the element that the reflectance can be changed is in the most transparent state and Rmax is the maximum reflectance where the element that the reflectance can be changed is in the most opaque state.

In this case also, if one of Conditions (3) and (4) is not satisfied, a color balance will be liable to deteriorate, which is unfavorable.

It is more desirable to satisfy the following conditions:

$$0.60 < R440/R520 < 1.30 \tag{3'}$$

$$0.70 < R600/R520 < 1.60 \tag{4'}$$

It is most desirable to satisfy the following conditions:

$$0.70 < R440/R520 < 1.20 \tag{3''}$$

$$0.80 < R600/R520 < 1.50 \tag{4''}$$

Here, a description will be given of the minimum transmittance $\tau min$ and the maximum transmittance $\tau max$. For example, the electrochromic element, as shown in FIG. 6, is brought into a high transmittance state and a low transmittance state by the application of predetermined two different voltages. At the highest transmittance, the electrochromic element is in the most transparent state. On the other hand, at the lowest transmittance, the electrochromic element is in the most opaque state.

Thus, $\tau$min is the minimum transmittance where the element that the transmittance can be changed is in the most opaque state, and $\tau$max is the maximum transmittance where the element that the transmittance can be changed is in the most transparent state.

The element that the reflectance can be changed, although not shown, is brought into a high reflectance state and a low reflectance state by the application of predetermined two different voltages. At the highest reflectance, the element is in the most opaque state. However, little absorption is produced and hence light is reflected. On the other hand, at the lowest reflectance, the element is in the most transparent state.

Thus, Rmin is the minimum reflectance where the element that the reflectance can be changed is in the most transparent state and Rmax is the maximum reflectance where the element that the reflectance can be changed is in the most opaque state.

It is desirable that, for example, the electrochromic element is used as the optical element. The optical element is such that the chemical change is electrically controlled and thereby the transmittance or reflectance of light can be changed. The use of such an optical element is favorable for size, controllability, and response speed. In particular, the optical element (for example, the electrochromic element) is provided on the optical path to control the quantity of electricity, for example, under certain voltage. Whereby, a stable transmittance can be obtained by high-speed following. As a result, a high-speed, stable adjustment of the amount of light can be made. In this case, the ratio between the maximum transmittance $\tau$max ($\geqq 0.7$) and the minimum transmittance $\tau$min ($\leqq 0.3$) where the light of wavelength 520 nm passes once through the optical element must be at least 2.5. By doing so, the range of adjustment of the amount of light can be enlarged. Also, it is desirable that the ratio is at least 3.5, if possible. In the case of the reflectance, it must be at least 4, preferably at least 5.5.

For the optical system, an imaging optical system described below is extremely effective in reducing the depth of the electronic imaging apparatus, and therefore its effectiveness is heightened as the electronic image sensor becomes small in size. This imaging optical system has, at least, a reflecting surface and a lens unit with positive refracting power. Here, the reflecting surface is used to bend the optical path. The lens unit with positive refracting power is simply moved toward the object side when the magnification is changed in the range from the wide-angle position to the telephoto position. In this optical system, even when the aperture stop is set, for example, to around F8 that is normally used, the image quality is degraded and thus the aperture diameter cannot be stopped down. Hence, it is good practice to adjust the amount of light by using a combination of the optical element that the transmittance of light can be changed and the reflecting surface, or the optical element that the reflectance of light can be changed. In order to make the depth smaller, it is desirable that the optical system is constructed so that at least one reflecting surface is placed on the object side of the most object-side lens of all lens units that are movable in the magnification change.

Alternatively, at least one prism is placed in the optical system. The reflecting surface is placed nearly parallel to one surface of the prism. In addition, a medium that the transmittance of light can be changed may be interposed between one surface of the prism and the reflecting surface. In this case, the prism, the medium, and the reflecting surface constitute the optical element. Also, it is more favorable that the prism is located at the most object-side position of the optical system through which the optical path passes. This is because it is effective for changing the depth to a greater optical path length, that is, a smaller actual dimension by using a medium with high refractive power.

Moreover, it is desirable that the most object-side surface (the entrance surface) of the prism is concave. It is for this reason that the depth from the entrance surface of the entire optical system to the entrance pupil is made as small as possible and thereby the reflecting surface can be physically located closer to the entrance surface of the entire optical system, which is effective for reducing the depth. It is desirable that the refractive index of the prism is higher than 1.68 (the index higher than 1.75 is more desirable and the index higher than 1.80 is most desirable). It is thus desirable that the refractive index is as high as possible.

Also, in addition to the above description, when the refractive index of the prism is enhanced, the following effect is secured. The medium that the transmittance is changed has an extremely higher index than ordinary glass. As such, when it is assumed that the medium is sandwiched between the prism and the reflecting surface, without including air, a high reflectance is caused at an interface between the prism and the medium. As a result, a part of the imaging beam to be originally reflected by the reflecting surface is reflected by the interface to form a ghost image. It is thus desirable that the difference of the refractive index between the prism and the medium is less than 0.4 (the difference less than 0.3 is more desirable and the difference less than 0.2 is most desirable). As mentioned above, the refractive index of the prism is increased and thereby the production of ghost can be suppressed.

Alternatively, when the condition of the refractive index of the prism is disregarded, it is desirable that the relation between a reflectance Rb at the interface and a reflectance Rm at the reflecting surface relative to light of wavelength 520 nm and a spacing d between both surfaces are set as described below.

$0.1 < Rb / \{(1-Rb)(Rm \times \tau 520^2)\} < 10$ d=pixel pitch$\times \alpha$/cos $\theta$ $0 < \alpha < 1.0$ (where $\alpha$ is a coefficient.)

$20° < \theta < 70°$ (where $\theta$ is an angle made by the reflecting surface with the optical axis of incidence.)

The above conditions are used by making reverse use of a twin image produced by reflections from both surfaces. That is, the twin image is used to eliminate aliasing caused by a component beyond the Nyquist rate of the electronic image sensor. This uses the twin image to bring about an effect like an optical low-pass filter. If these conditions are not satisfied, the resolving power will be extremely impaired or an image which can be thought of as ghost will be formed, which is unfavorable.

Also, the focusing function is preferably performed on the image side of the optical system. In the present invention, a movable lens unit located at the most image-side position is such as to exercise the focusing function. It is desirable that the electronic imaging apparatus is provided with a means for electrically controlling electric signals relating to the condition of the optical system and to an image derived from the electronic image sensor, and the transmittance of the medium.

In accordance with the drawings, the embodiments of the present invention will be described below.

First Embodiment

Figure 2:
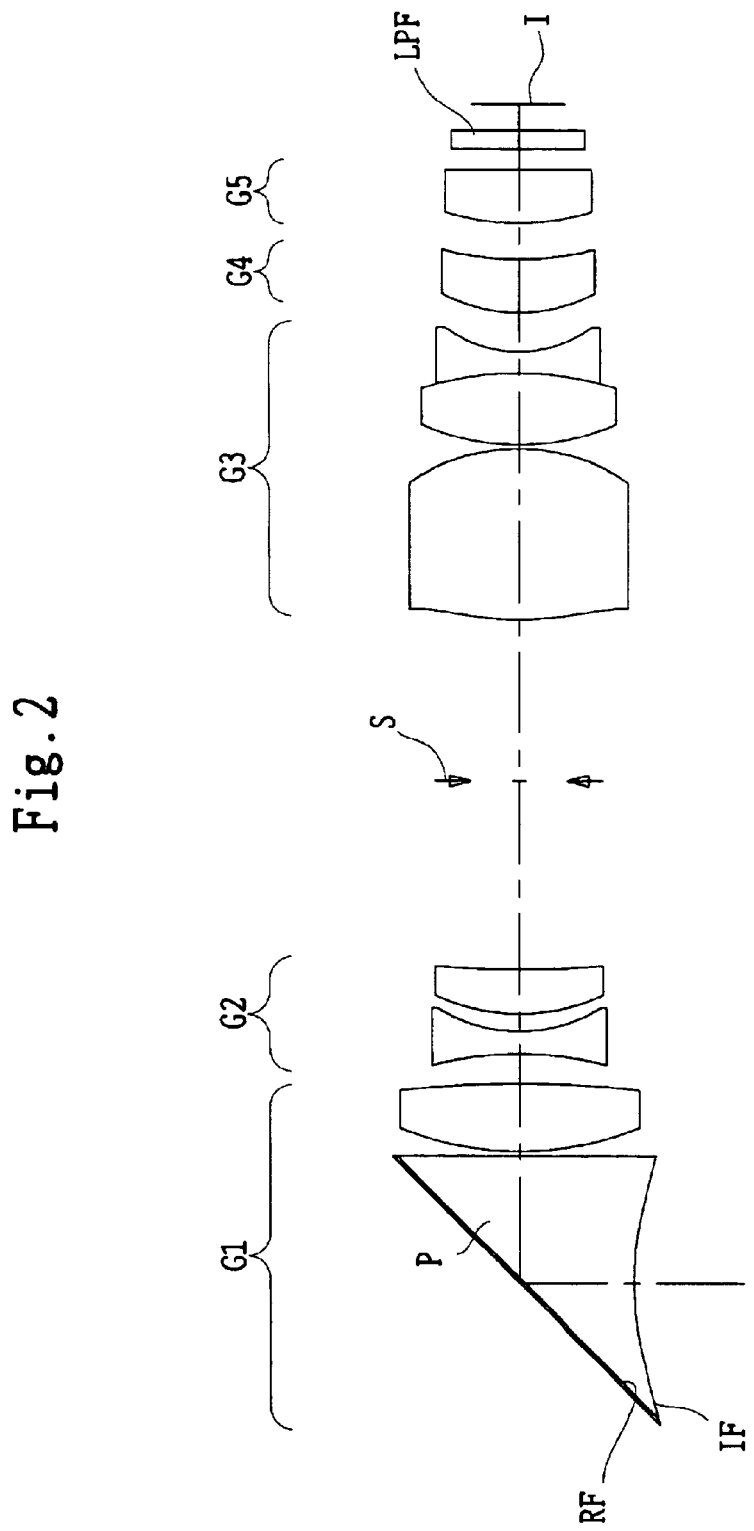
FIG. 2 is a sectional view showing an optical arrangement, developed along the optical axis, where a variable-transmittance material is sandwiched between the reflecting surface and a prism in the first embodiment.

FIGS. 1 and 2 show optical arrangements in focusing of an infinite object point at the wide-angle position, of the first embodiment of the electronic imaging apparatus. The optical system shown in each figure is a path-bending optical system. In these figures, reference symbol I represents the imaging surface of a CCD which is the electronic image sensor and LPF represents an optical low-pass filter. The electronic imaging apparatus comprises, in order from the object side, the optical system of the present invention, the optical low-pass filter LPF, and the imaging surface I.

The optical system in the first embodiment comprises, in order from the object side, a first lens unit G1, a second lens unit G2, an aperture stop S, a third lens unit G3, a fourth lens unit G4, and a fifth lens unit G5.

The first lens unit G1 has the positive refracting power as a whole. The first lens unit G1 includes, in order from the object side, a prism P and a rear lens sub-unit. The prism P has a reflecting surface RF for bending the optical path on the object side and a ray incident surface IF. The incident surface IF is a concave surface directed toward the object side and is configured as an aspherical surface that divergence is impaired progressively as separated from the optical axis. The rear lens sub-unit has the positive refracting power. Also, in FIG. 1, a variable-reflectance medium comes in close contact with the reflecting surface RF of the prism P, while in FIG. 2, a variable-transmittance medium is sandwiched between the reflecting surface RF and the opposite surface of the prism P. They constitute the optical element in the present invention.

The prism P is constructed as a reflecting prism bending the optical path by 90°. The rear lens sub-unit is constructed with a biconvex positive lens. The second lens unit G2 includes, in order from the object side, a biconcave negative lens and a positive meniscus lens and has the negative refracting power as a whole. The third lens unit G3 includes, in order from the object side, a biconvex positive lens and a cemented doublet of a biconvex positive lens and a biconcave negative lens. The fourth lens unit G4 is constructed with a positive meniscus lens. The fifth lens unit G5 has a plano-convex lens with a convex surface directed toward the object side.

Also, the aspect ratio of an effective imaging area in each of the embodiments of the present invention is 3:4, and the optical path is bent in a lateral direction.

When the magnification of the optical system is changed in the range from the wide-angle position to the telephoto position in focusing of the infinite object point, the first lens unit G1 and the aperture stop S remain fixed, the second lens unit G2 is moved toward only the image side, and the third lens unit G3 is moved toward only the object side. In a focusing operation, the fourth lens unit G4 and the fifth lens unit G5 are moved along the optical axis.

Aspherical surfaces are used for the ray incident surface IF of the prism P in the first lens unit G1, the object-side surface of the biconvex positive lens in the first lens unit G1, the object- and image-side surfaces of the biconcave negative lens in the second lens unit G2, the object- and image-side surfaces of the biconvex positive lens in the third lens unit G3, and the object-side surface of the plano-convex lens in the fifth lens unit G5.

Subsequently, numerical data of optical members constituting the optical system of the first embodiment are shown below.

In the numerical data of the first embodiment, $r_1, r_2, \ldots$ denote radii of curvature of surfaces of a prism and individual lenses; $d_1, d_2, \ldots$ denote thicknesses of the prism and individual lenses or air spacings between them; $n_{d1}, n_{d2}, \ldots$ denote refractive indices of the prism and individual lenses at the d line; $\nu_{d1}, \nu_{d2}, \ldots$ denote Abbe's numbers of the prism and individual lenses; Fno denotes an F-number; f denotes the focal length of the entire system; and D0 denotes a distance from the object to the first surface. Also, when z is the direction of the optical axis, y is the direction perpendicular to the optical axis, K is a conic constant, and $A_4, A_6, A_8$, and $A_{10}$ are aspherical coefficients, the configuration of the aspherical surface is expressed by the following equation:

$$z=(y^2/r)/[1+\{1-(1+K)(y/r)^2\}^{1/2}]+A_4 y^4+A_6 y^6+A_8 y^8+A_{10} y^{10}$$

These symbols are also used for the numerical data of other embodiments to be described later.

Numerical data 1

$r_1 = -9.4520$ (aspherical surface)
    $d_1 = 8.2000$     $n_{d1} = 1.80518$     $\nu_{d1} = 25.42$
$r_2 = \infty$
    $d_2 = 0.1500$
$r_3 = 9.6078$ (aspherical surface)
    $d_3 = 2.3000$     $n_{d3} = 1.78800$     $\nu_{d3} = 47.37$
$r_4 = -36.5601$
    $d_4 = D4$
$r_5 = -12.2968$ (aspherical surface)
    $d_5 = 0.8000$     $n_{d5} = 1.74320$     $\nu_{d5} = 49.34$
$r_6 = 5.0653$ (aspherical surface)
    $d_6 = 0.6000$
$r_7 = 7.3064$
    $d_7 = 1.5000$     $n_{d7} = 1.84666$     $\nu_{d7} = 23.78$
$r_8 = 30.2966$
    $d_8 = D8$
$r_9 = \infty$ (stop)
    $d_9 = D9$
$r_{10} = 10.4103$ (aspherical surface)
    $d_{10} = 5.8865$     $n_{d10} = 1.69350$     $\nu_{d10} = 53.21$
$r_{11} = -6.9390$ (aspherical surface)
    $d_{11} = 0.1500$
$r_{12} = 8.4519$
    $d_{12} = 2.4987$     $n_{d12} = 1.51742$     $\nu_{d12} = 52.43$
$r_{13} = -10.7434$
    $d_{13} = 0.7000$     $n_{d13} = 1.84666$     $\nu_{d13} = 23.78$
$r_{14} = 4.1500$
    $d_{14} = D14$
$r_{15} = 6.0955$
    $d_{15} = 1.8000$     $n_{d15} = 1.48749$     $\nu_{d15} = 70.23$
$r_{16} = 9.7078$
    $d_{16} = D16$
$r_{17} = 8.7554$ (aspherical surface)
    $d_{17} = 1.8000$     $n_{d17} = 1.58423$     $\nu_{d17} = 30.49$
$r_{18} = \infty$
    $d_{18} = 0.7000$
$r_{19} = \infty$
    $d_{19} = 0.6000$     $n_{d19} = 1.51633$     $\nu_{d19} = 64.14$
$r_{20} = \infty$
    $d_{20} = D20$
$r_{21} = \infty$ (imaging surface Aspherical coefficients First surface $K = 0$
$A_2 = 0$     $A_4 = 9.5837 \times 10^{-4}$     $A_6 = -1.1998 \times 10^{-5}$
$A_8 = 1.1926 \times 10^{-7}$ Third surface $K = 0$
$A_2 = 0$     $A_4 = -5.2184 \times 10^{-4}$     $A_6 = 1.4369 \times 10^{-6}$
$A_8 = 1.3193 \times 10^{-8}$ -continued Fifth surface $K = 0$
$A_2 = 0$         $A_4 = -8.5131 \times 10^{-4}$   $A_6 = 1.2914 \times 10^{-4}$
$A_8 = -5.4974 \times 10^{-6}$ Sixth surface $K = 0$
$A_2 = 0$         $A_4 = -1.8812 \times 10^{-3}$   $A_6 = 1.7977 \times 10^{-4}$
$A_8 = -1.1418 \times 10^{-5}$ Tenth surface $K = 0$
$A_2 = 0$         $A_4 = -9.0524 \times 10^{-4}$   $A_6 = -1.4899 \times 10^{-5}$
$A_8 = -2.7354 \times 10^{-6}$ Eleventh surface $K = 0$
$A_2 = 0$         $A_4 = 2.0252 \times 10^{-4}$    $A_6 = -1.5683 \times 10^{-5}$
$A_8 = -2.5889 \times 10^{-7}$ Seventeenth surface $K = 0$
$A_2 = 0$         $A_4 = 1.3132 \times 10^{-4}$    $A_6 = 2.2399 \times 10^{-5}$
$A_8 = -2.5971 \times 10^{-6}$ Zoom data
When the distance D0 is ∞,

|       | Wide-angle | Middle  | Telephoto |
|-------|------------|---------|-----------|
| f (mm)| 4.60394    | 7.80037 | 13.19942  |
| Fno   | 2.8634     | 3.5902  | 4.5306    |
| D0    | ∞          | ∞       | ∞         |
| D4    | 0.99877    | 3.91855 | 6.57280   |
| D8    | 6.47386    | 3.54652 | 0.89974   |
| D9    | 5.54148    | 3.31646 | 0.99874   |
| D14   | 1.37738    | 3.62339 | 5.91816   |
| D16   | 1.19791    | 1.19758 | 1.19992   |
| D20   | 0.89970    | 0.87855 | 0.89957   |

Second Embodiment

Figure 3:
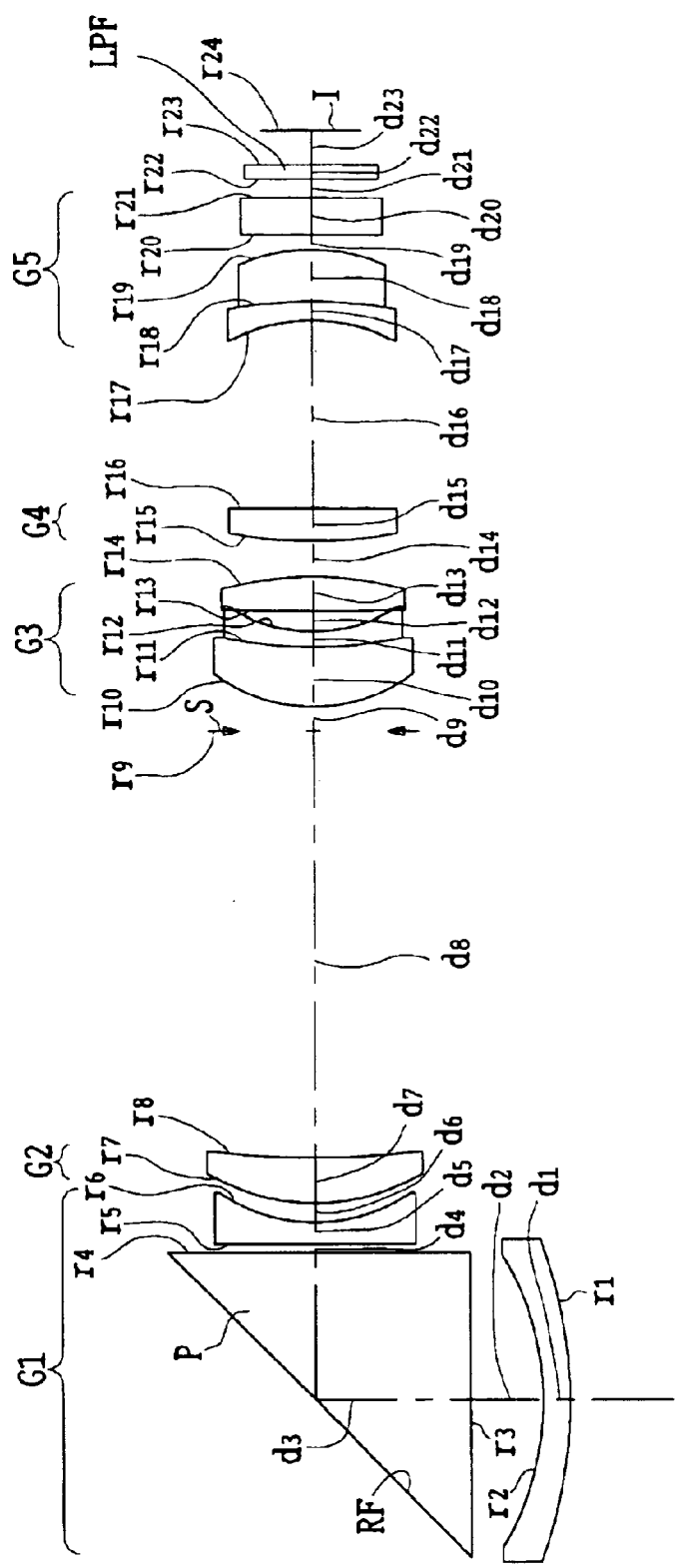
FIG. 3 is a sectional view showing an optical arrangement, developed along the optical axis, where the variable-reflectance material comes in close contact with the reflecting surface in a second embodiment of the electronic imaging apparatus according to the present invention.
Figure 4:
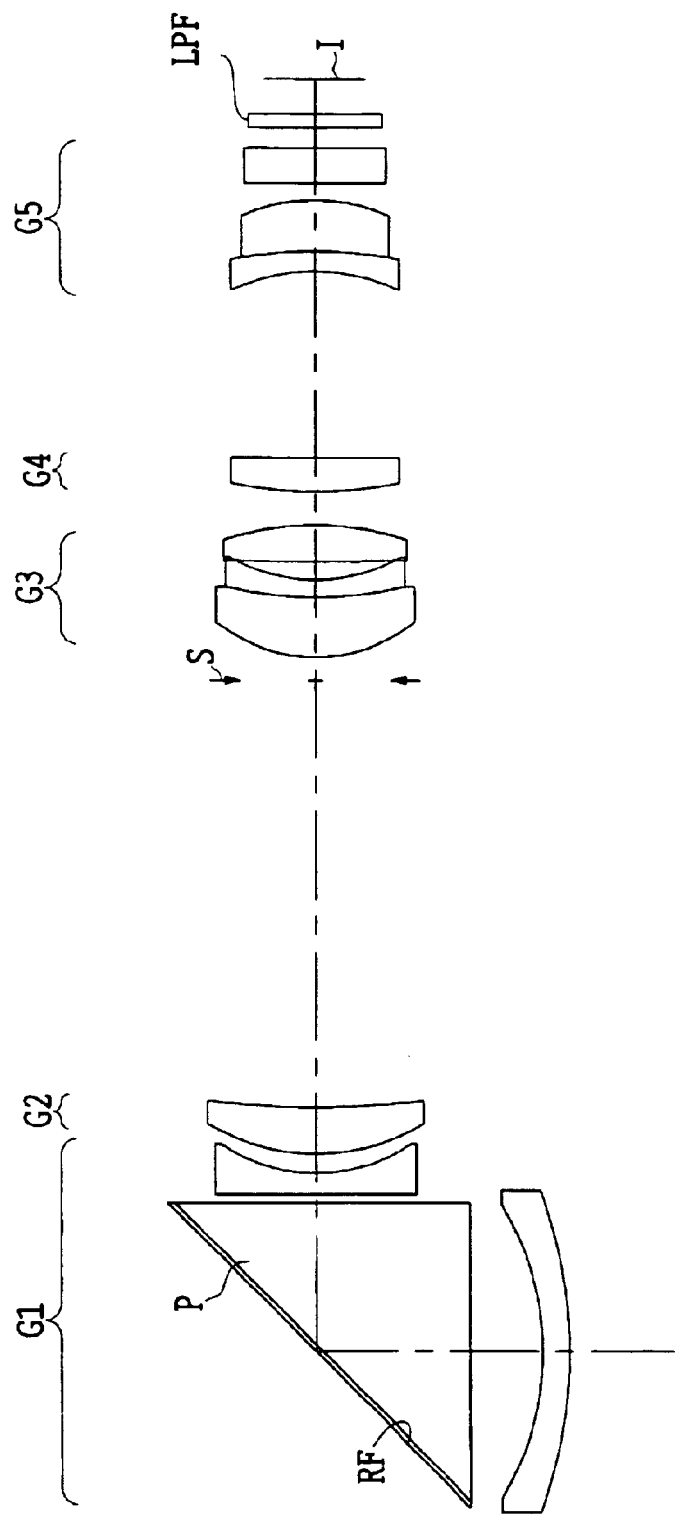
FIG. 4 is a sectional view showing an optical arrangement, developed along the optical axis, where the variable-transmittance material is sandwiched between the reflecting surface and a prism in the second embodiment.

FIGS. 3 and 4 show optical arrangements in focusing of an infinite object point at the wide-angle position, of the second embodiment of the electronic imaging apparatus. The optical system shown in each figure is a path-bending optical system. The electronic imaging apparatus comprises, in order from the object side, the optical system of the present invention, the optical low-pass filter LPF, and the imaging surface I.

The optical system in the second embodiment comprises, in order from the object side, the first lens unit G1, the second lens unit G2, the aperture stop S, the third lens unit G3, the fourth lens unit G4, and the fifth lens unit G5.

The first lens unit G1 has the negative refracting power as a whole. The first lens unit G1 includes, in order from the object side, a positive meniscus lens, the prism P, and a rear lens sub-unit. The prism P has the reflecting surface RF for bending the optical path on the object side. The rear lens sub-unit has the negative refracting power. Also, in FIG. 3, the variable-reflectance medium comes in close contact with the reflecting surface RF of the prism P, while in FIG. 4, the variable-transmittance medium is sandwiched between the reflecting surface RF and the opposite surface of the prism P. Each of them constitutes the optical element in the present invention.

The prism P is constructed as the reflecting prism bending the optical path by 90°. The rear lens sub-unit is constructed with a biconcave negative lens. The second lens unit G2 is constructed with a positive meniscus lens. Third lens unit G3 includes, in order from the object side, a cemented doublet of two positive meniscus lenses and a biconvex positive lens. The fourth lens unit G4 is constructed with a positive meniscus lens. The fifth lens unit G5 is constructed with a cemented doublet of two negative meniscus lenses. Also, the fifth lens unit G5 may include a plane-parallel plate and the optical low-pass filter LPF.

When the magnification of the optical system is changed in the range from the wide-angle position to the telephoto position in focusing of the infinite object point, the first lens unit G1 and the aperture stop S remain fixed and the second lens unit G2 is moved toward only the image side. In the focusing operation, the fourth lens unit G4 and the fifth lens unit G5 are moved along the optical axis.

Aspherical surfaces are used for the entrance and exit surface of the biconcave negative lens of the rear lens sub-unit in the first lens unit G1, the most object-side surface of the third lens unit G3, and the image-side surface of the cemented doublet in the fifth lens unit G5.

The second embodiment, as its modified example, instead of using the positive meniscus lens located at the most object-side position of the first lens unit G1 and the prism P, may be designed to use the prism with the concave surface, which is the entrance surface, directed toward the object side, as in the first embodiment.

Subsequently, numerical data of optical members constituting the optical system of the second embodiment are shown below.

Numerical data 2

$r_1 = 18.1242$
    $d_1 = 1.1000$      $n_{d1} = 1.77250$     $v_{d1} = 49.60$
$r_2 = 11.0917$
    $d_2 = 3.0000$
$r_3 = \infty$
    $d_3 = 12.5000$     $n_{d3} = 1.80610$     $v_{d3} = 40.92$
$r_4 = \infty$
    $d_4 = 0.3000$
$r_5 = -189.0024$ (aspherical surface)
    $d_5 = 0.9000$      $n_{d5} = 1.80610$     $v_{d5} = 40.92$
$r_6 = 7.0839$ (aspherical surface)
    $d_6 = 0.8000$
$r_7 = 8.8339$
    $d_7 = 1.9000$      $n_{d7} = 1.76182$     $v_{d7} = 26.52$
$r_8 = 33.9090$
    $d_8 = D8$
$r_9 = \infty$ (stop)
    $d_9 = 1.0000$
$r_{10} = 6.5543$ (aspherical surface)
    $d_{10} = 2.5000$   $n_{d10} = 1.74320$    $v_{d10} = 49.34$
$r_{11} = 16.5000$
    $d_{11} = 0.7000$   $n_{d11} = 1.84666$    $v_{d11} = 23.78$
$r_{12} = 6.8813$
    $d_{12} = 0.8000$
$r_{13} = 110.5063$
    $d_{13} = 1.5000$   $n_{d13} = 1.72916$    $v_{d13} = 54.68$
$r_{14} = -13.4784$
    $d_{14} = D14$
$r_{15} = 17.0895$
    $d_{15} = 1.4000$   $n_{d15} = 1.48749$    $v_{d15} = 70:23$
$r_{16} = 214.7721$
    $d_{16} = D16$
$r_{17} = -8.1890$
    $_{17} = 0.8000$    $n_{d17} = 1.84666$    $v_{d17} = 23.78$
$r_{18} = -20.0000$
    $d_{18} = 2.1000$   $n_{d18} = 1.74320$    $v_{d18} = 49.34$
$r_{19} = -7.6979$ (aspherical surface)
    $d_{19} = 0.6600$
$r_{20} = \infty$
    $d_{20} = 1.4400$   $n_{d20} = 1.54771$    $v_{d20} = 62.84$ -continued $r_{21} = \infty$
$\quad d_{21} = 0.8000$
$r_{22} = \infty$
$\quad d_{22} = 0.6000 \quad n_{d22} = 1.51633 \quad v_{d22} = 64.14$
$r_{23} = \infty$
$\quad d_{23} = D23$
$r_{24} = \infty$ (imaging surface)

Aspherical coefficients

Fifth surface $K = 0$
$A_2 = 0 \qquad A_4 = 3.1801 \times 10^{-4} \qquad A_6 = -7.4933 \times 10^{-6}$
$A_8 = 1.3268 \times 10^{-7}$ Sixth surface $K = 0$
$A_2 = 0 \qquad A_4 = 1.0755 \times 10^{-4} \qquad A_6 = -2.2069 \times 10^{-6}$
$A_8 = -4.2215 \times 10^{-8} \quad A_{10} = 1.2946 \times 10^{-9}$ Tenth surface $K = 0$
$A_2 = 0 \qquad A_4 = -2.8130 \times 10^{-4} \qquad A_6 = -7.1076 \times 10^{-7}$
$A_8 = -1.7424 \times 10^{-7}$ Nineteenth surface $K = 0$
$A_2 = 0 \qquad A_4 = 5.5956 \times 10^{-4} \qquad A_6 = -1.7107 \times 10^{-5}$
$A_8 = 5.6651 \times 10^{-7}$ Zoom data
When the distance D0 is $\infty$,

| | Wide-angle | Middle | Telephoto |
|---|---|---|---|
| F (mm) | 6.00227 | 10.39870 | 17.99964 |
| Fno | 2.8302 | 3.7274 | 4.5463 |
| D0 | $\infty$ | $\infty$ | $\infty$ |
| D8 | 17.74229 | 9.38185 | 1.50012 |
| D14 | 1.39992 | 10.71211 | 9.41560 |
| D16 | 7.69801 | 6.74827 | 15.92451 |
| D23 | 1.36012 | 1.35450 | 1.36012 |

Any of the above amendments uses the optical system which has one reflecting surface, but the optical system may have two or more reflecting surfaces.

Figure 5:
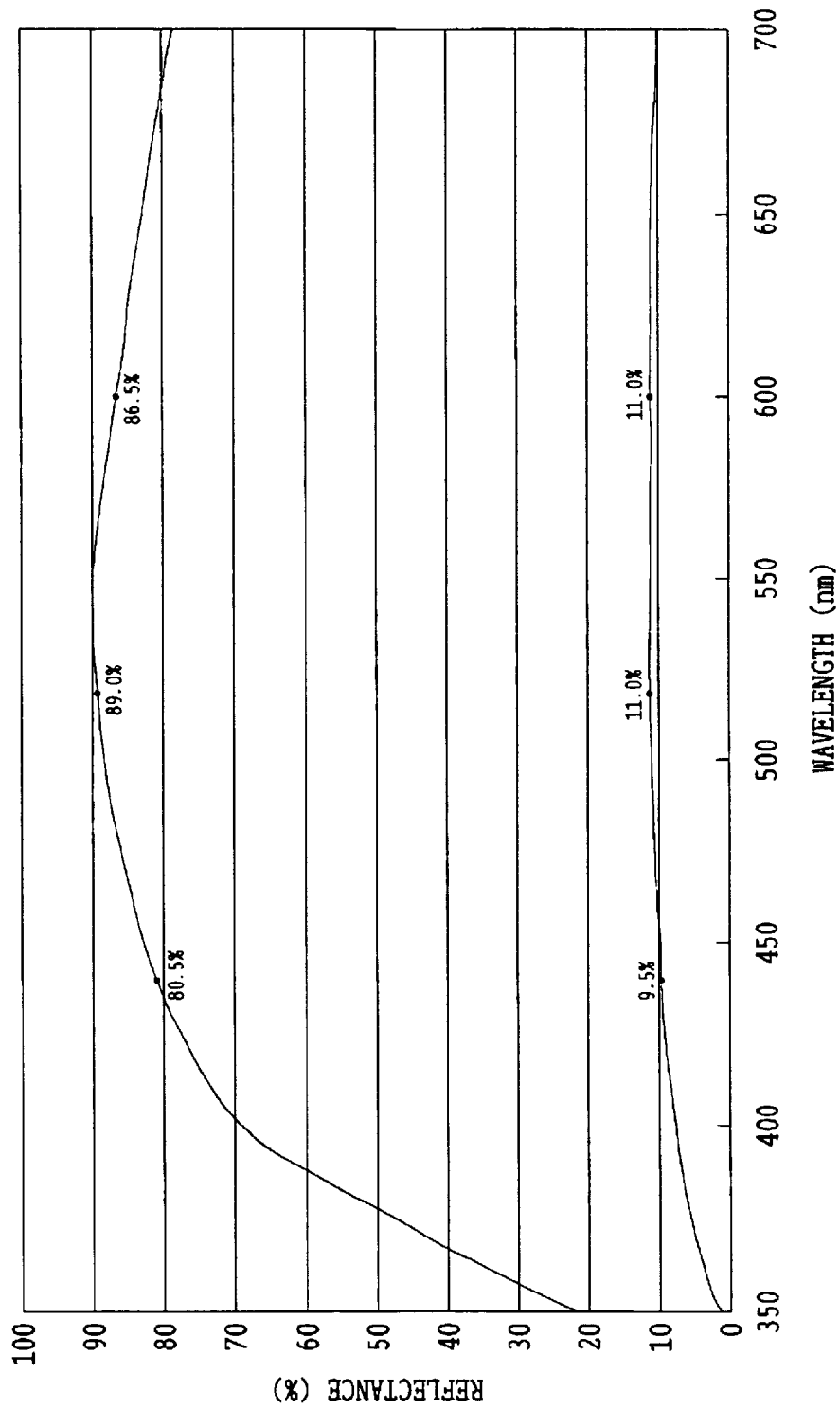
FIG. 5 is a diagram showing spectral characteristics of an electrochromic element used as the variable-reflectance material.

FIG. 5 shows the spectral characteristics of the electrochromic element used as the variable-reflectance material. This material comes in close contact with the reflecting surface of the prism P, shown in FIGS. 1 and 3. FIG. 6 shows the spectral characteristics of the electrochromic element (sandwiched between two glass plates, each 1 mm thick) used as the variable-transmittance material. This material is inserted between the reflecting surface RF and the opposite surface of the prism P, shown in FIGS. 2 and 4.

Values of individual conditions and parameters are listed in the following table.

Here, A1 (the first embodiment) and A2 (the second embodiment) denote the transmittances of the transmission-type electrochromic element itself in a combination of the electrochromic element with the reflecting surface (refer to FIGS. 2 and 4). B1 (the first embodiment) and B2 (the second embodiment) denote the transmittances of the reflection-type electrochromic element itself (refer to FIGS. 1 and 3). Also, fb denotes the focal length of the second lens unit G2 which has the positive refracting power and is simply moved when the magnification is changed in the range from the wide-angle position to the telephoto position, and fb denotes the focal length of the entire system at the wide-angle position. Although in this table the reflectances and transmittances of the electrochromic elements are shown with respect to their maximum and minimum values only, their intermediate values can also be taken continuously.

| | First embodiment | Second embodiment |
|---|---|---|
| | A1 | A2 |
| $\tau 440/\tau 520$ (at $\tau$max) | 0.951 | 0.951 |
| $\tau 600/\tau 520$ (at $\tau$max) | 0.994 | 0.994 |
| $\tau 440/\tau 520$ (at $\tau$min) | 0.917 | 0.917 |
| $\tau 600/\tau 520$ (at $\tau$min) | 1.028 | 1.028 |
| | B1 | B2 |
| R440/R520 (at $\tau$max) | 0.899 | 0.899 |
| R600/R520 (at $\tau$max) | 0.971 | 0.971 |
| R440/R520 (at $\tau$min) | 0.864 | 0.864 |
| R600/R520 (at $\tau$min) | 1.000 | 1.000 |
| Rb (at $\tau$max) | 0.25 | 0.25 |
| Rb (at $\tau$min) | 0.15 | 0.15 |
| Rm | 0.85 | 0.85 |
| $\tau 520$ (at $\tau$max) | 0.81 | 0.81 |
| $\tau 520$ (at $\tau$min) | 0.18 | 0.18 |
| Rb/{(1 − Rb)(Rm × $\tau 520^2$)} (at $\tau$max) | 0.5977 | 0.5977 |
| Rb/{(1 − Rb)(Rm × $\tau 520^2$)} (at $\tau$min) | 6.4078 | 6.4078 |
| $\alpha$ | 0.5 | 0.5 |
| $\theta$ | 45° | 45° |
| Pixel pitch | 0.0025 mm | 0.0025 mm |
| d | 0.001768 mm | 0.001768 mm |
| fb/fw | 2.1602 | 2.4873 |
| Refractive index of medium of prism | 1.80518 | 1.8061 |

What is claimed is:

1. An electronic imaging apparatus comprising:

an optical system having a reflecting surface for bending an optical path; and a variable-transmittance optical element placed in the optical system, the variable-transmittance optical element being constructed so that a ray of light passes through the optical element a plurality of time, wherein the variable-transmittance optical element is provided on the reflecting surface or is placed immediately before the reflecting surface.

2. An electronic imaging apparatus comprising:

an optical system having a reflecting surface for bending an optical path; and a variable-transmittance optical element placed in the optical system, the variable-transmittance optical element being constructed so that a ray of light passes through the optical element a plurality of time, wherein the variable-transmittance optical element satisfies the following conditions within a limit of $\tau\text{min} \leq \tau 520 \leq \tau\text{max}$:

$$0.70 < \tau 440/\tau 520 < 1.20$$

$$0.80 < \tau 600/\tau 520 < 1.30$$

where $\tau 520$ is a transmittance of light of wavelength 520 nm, $\tau 440$ is a transmittance of light of wavelength 440 nm, $\tau 600$ is a transmittance of light of wavelength 600 nm, $\tau$min is a minimum transmittance where the element that a transmittance can be changed is in a most opaque state, and $\tau$max is a maximum transmittance where the element that the transmittance can be changed is in a most transparent state.

3. An electronic imaging apparatus comprising:

an optical system having a reflecting surface for bending an optical path; and a variable-transmittance optical element placed in the optical system, the variable-transmittance optical element being constructed so that a ray of light passes through the optical element a plurality of time, wherein the variable transmittance optical element is constructed of a medium capable oh changing a transmittance of light by electrically controlling a chemical change.

4. An electronic imaging apparatus comprising:

an optical system having a reflecting surface for bending an optical path; and a variable-transmittance optical element placed in the optical system, the variable-transmittance optical element being constructed so that a ray of light passes through the optical element a plurality of time, wherein the optical system includes a lens unit having positive refracting power, simply moved toward an object side when a magnification of the optical system is changed in a range from a wide-angle position to a telephoto position.

5. An electronic imaging apparatus comprising:

an optical system having a reflecting surface for bending an optical path; and a variable-transmittance optical element placed in the optical system, the variable-transmittance optical element being constructed so that a ray of light passes through the optical element a plurality of time, wherein the optical system includes at least one prism, the prism being located at a most object-side position of the optical system through which the optical path passes.

6. An electronic imaging apparatus according to claim 5, wherein a most object-side surface of the prism is concave.

7. An electronic imaging apparatus according to claim 5, wherein a refractive index of the prism is higher than 1.68.

8. An electronic imaging apparatus comprising:

an optical system having a reflecting surface for bending an optical path; and a variable-transmittance optical element placed in the optical system, the variable-transmittance optical element being constructed so that a ray of light passes through the optical element a plurality of time, wherein a most image-side movable lens unit of the optical system has a focusing function.

9. An electronic imaging apparatus according to claim 1, wherein the optical system includes at least one prism and the reflecting surface is one surface of the prism.

10. An electronic imaging apparatus comprising:

an optical system having a reflecting surface for bending an optical path; and a variable-reflectance optical element placed in the optical system, wherein the optical system includes a lens unit having positive refracting power, simply moved toward an object side when a magnification of the optical system is changed in a range from a wide-angle position to a telephoto position.

11. An electronic imaging apparatus according to claim 10, wherein the variable-reflectance optical element satisfies the following conditions within a limit of $Rmin \leq R520 \leq Rmax$:

$$0.50 < R440/R520 \leq 1.40$$

$$0.60 < R600/R520 \leq 1.70$$

where R520 is a reflectance of light of wavelength 520 nm, R440 is a reflectance of light of wavelength 440 nm, R600 is a reflectance of light of wavelength 600 nm, Rmin is a minimum reflectance where the element that a reflectance can be changed is in a most transparent state, and Rmax is a maximum reflectance where the element that the reflectance can be changed is in a most opaque state.

12. An electronic imaging apparatus comprising:

an optical system having a reflecting surface for bending an optical path; and a variable-reflectance optical element placed in the optical system, wherein the variable-reflectance optical element satisfies the following conditions within a limit of $Rmin \leq R520 \leq Rmax$:

$$0.50 < R440/R520 \leq 1.40$$

$$0.60 < R600/R520 \leq 1.70$$

where R520 is a reflectance of light of wavelength 520 nm, R440 is a reflectance of light of wavelength 440 nm, R600 is a reflectance of light of wavelength 600 nm, Rmin is a minimum reflectance where the element that a reflectance can be changed is in a most transparent state, and Rmax is a maximum reflectance where the element that the reflectance can be changed is in a most opaque state.

* * * * *

UNITED STATES PATENT AND TRADEMARK OFFICE
CERTIFICATE OF CORRECTION

PATENT NO. : 6,934,095 B2
DATED : August 23, 2005
INVENTOR(S) : Shinichi Mihara

It is certified that error appears in the above-identified patent and that said Letters Patent is hereby corrected as shown below:

<u>Column 14,</u>
Lines 16 and 36, replace "$\leqq 1.40$" with -- <1.40 --.
Lines 18 and 38, replace "$\leqq 1.70$" with -- <1.70 --.

Signed and Sealed this

Twenty-eighth Day of March, 2006

JON W. DUDAS
*Director of the United States Patent and Trademark Office*